July 6, 1937.  J. HEUE ET AL  2,086,266
APPARATUS FOR TREATING GRAIN
Filed Dec. 11, 1935  3 Sheets-Sheet 2

INVENTOR.
John Heue
Arthur W. Werner
BY
Morrell, Liebe & Morrell
ATTORNEYS.

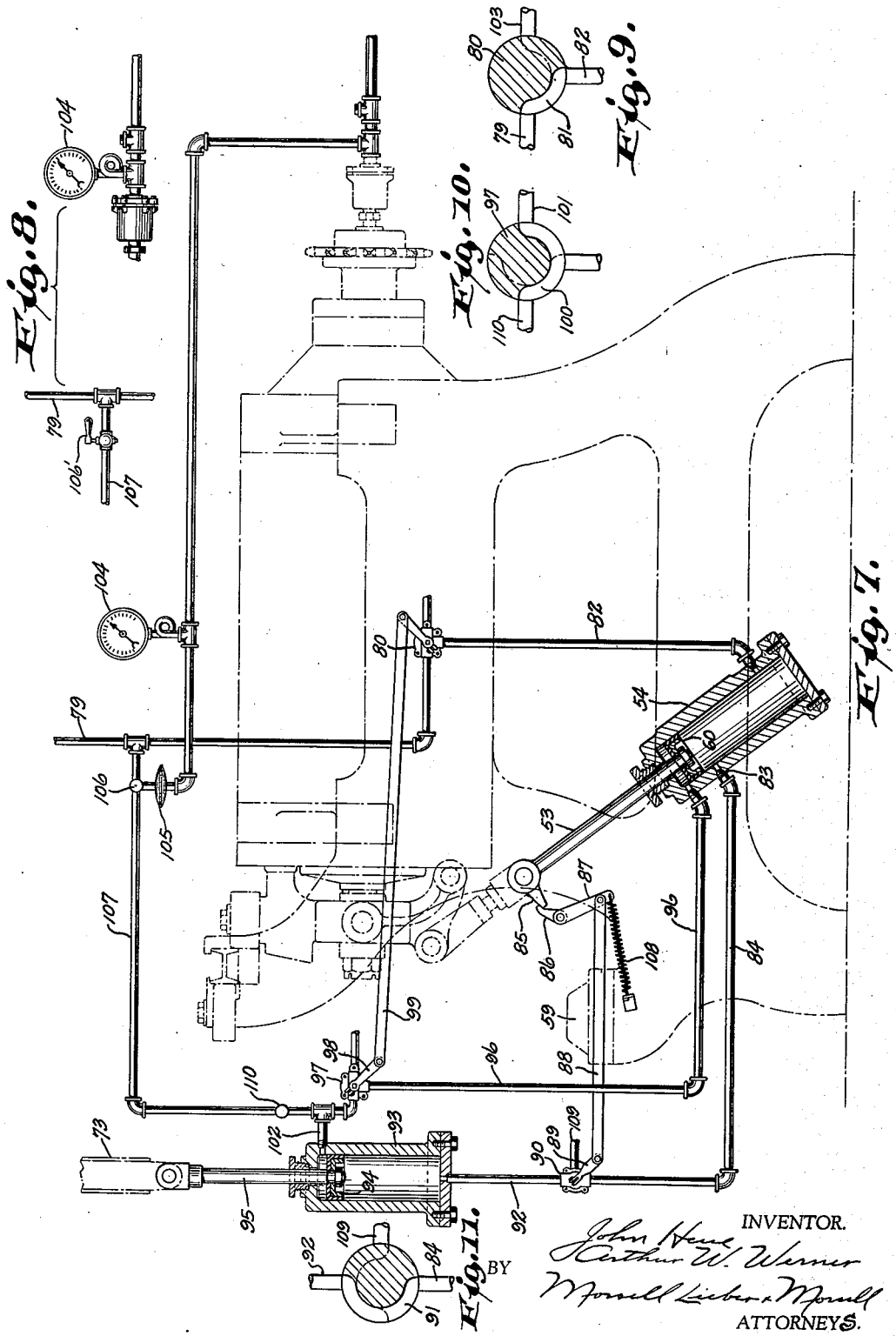

Patented July 6, 1937

2,086,266

UNITED STATES PATENT OFFICE 2,086,266

APPARATUS FOR TREATING GRAIN

John Heue and Arthur W. Werner, Milwaukee, Wis.; said Werner assignor to said Heue Application December 11, 1935, Serial No. 53,870

13 Claims. (Cl. 99—238)

This invention relates to improvements in apparatus for treating grain.

Cereal breakfast foods, and similar products are commonly produced by subjecting grain within a closed chamber to the action of heat, moisture, and pressure, the pressure being released at the expiration of a pre-determined interval of time to cause a sudden reduction of the pressure in the chamber and a resulting explosion or expansion of the grain cells. This in turn results in enlargement of the grain particles to many times their original size.

The present invention contemplates improved apparatus for treating grain in the above manner, and it is a general object to provide a device of the class described wherein a uniform product is obtained in an efficient manner requiring a minimum of supervision.

A further object of the invention is to provide in apparatus of the class described having a treating chamber and a closure therefor, novel means for controlling the operation of said closure and for locking the same in sealing position with respect to said chamber.

A further object of the invention is to provide in apparatus for treating grain, pneumatic means for moving the closure from open to closed position.

A more specific object of the invention is to provide in an apparatus as above described, a resilient bumper for cushioning the opening movement of the closure, and pneumatic means for checking the rebound from the bumper.

A further object of the invention is to provide an apparatus for treating grain or the like, wherein, in one embodiment of the invention, the operation of the closure may be rendered substantially automatic.

Other specific objects of the invention are to provide in said automatic embodiment of the invention:

Means responsive to movement of the closure from open to closed position for automatically actuating a closure locking member; and Means responsive to a pre-determined pressure in the steam line for causing automatic release of said closure locking member to permit the opening of the closure and discharge of the treated product.

With the above and other objects in view the invention consists of the improved apparatus for treating grain, and all its parts and combinations as set forth in the claims and all equivalents thereof.

In the accompanying drawings in which the same reference numerals designate the same parts in all of the views:

Fig. 4 is a fragmentary detail view taken on the line 4—4 of Fig. 1;

Fig. 7 is a partially diagrammatic view showing how the device may be rendered substantially automatic in operation, the treating apparatus being shown by dot-and-dash lines to bring out the association of the automatic controls therewith;

Fig. 8 illustrates fragments of the system shown in Fig. 7 showing a modification wherein the operation is less automatic;

Fig. 9 is a diagrammatic view showing the interior of the control valve for the closure operating cylinder; and Figs. 10 and 11 are diagrammatic views showing the interior of the valves for controlling the locking rail cylinder.

Figure 3:
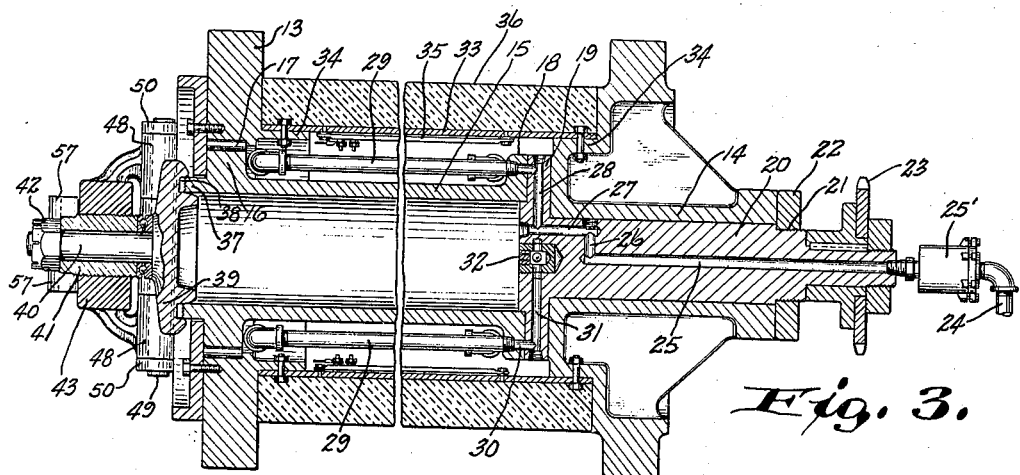
Fig. 3 is a sectional view taken on line 3—3 of Fig. 1.

Referring more particularly to Figs. 1 to 6 inclusive of the drawings, the numeral 12 designates a supporting frame having upper bearing portions 13 and 14 within which a cylindrical treating chamber 15 is rotatably mounted in the manner shown in Fig. 3.

Near one end, the treating chamber is formed with an annular flange 16 which may operate on roller bearings 17 associated with the bearing portion 13. The other end of the oven is flanged as at 18, and an end member 19 is secured to said flange 18, the end member having an extension 20 which is journaled in the bearing portion 14 of the frame, the extreme outer end of the extension 20 projecting beyond the end of the bearing portion 14 and being threaded as at 21 for the reception of a collar 22. Keyed to this extreme outer end of the extension 20 is a sprocket wheel 23 which may be connected through the medium of a sprocket chain with a suitable source of motion to provide for rotation of the treating chamber 15 within the frame 12.

Steam may be admitted from a pipe 24 leading from a source of supply to a duct 25 in the extension 20, there being a swivel joint of any suitable form as at 25' to permit rotation of the treating chamber without interfering with the admission of the steam. The duct 25 connects through ducts 26, 27, and 28 with a steam coil 29 which extends back and forth around the periphery of the treating chamber 15. The steam coil 29 ultimately connects as at 30 with a duct 31 leading to a nozzle 32. It will thus be seen that steam admitted through the pipe 24 will first pass through the exterior coil, heating the chamber 15 from the exterior, and will ultimately be discharged into the interior of the chamber by means of the nozzle 32.

A cylindrical casing 33 is secured to ledges 34, and forms an enclosure for the coil 29. It is also preferred to have a plurality of electrical heating elements 35 positioned at intervals on the interior of the casing 33 around the treating chamber. This provides for superheating of the steam and for additional heating of the treating chamber. Insulating material 36 is preferably employed on the exterior of the cylindrical casing 33.

The front end of the treating chamber 15 is formed with an annular rib or projection 37 for cooperation with a groove 38 in a closure member 39. The closure member has a stud 40 projecting from the central portion of its outer face, and said stud is rotatable in a sleeve 41. A lock nut 42 on the outer end of the stud may be set to provide proper clearance and for proper rotation of the stud within the sleeve.

Threaded on the exterior of the sleeve 41 is a disc 43 forming the central portion of a yoke 44. The upper portion of the yoke carries a horizontally disposed roller 45 and is also formed with an inward projection 46 forming a stop. The lower portion of the yoke has depending arms 47 formed with bearings 48 on their lower ends.

A pivot pin 49 extending through brackets 50 in connection with the frame of the apparatus and through the bearings 48 provides for pivotal movement of the closure into and out of closing position with respect to the treating chamber. Another depending arm 51 between the two arms 47 carries a bearing portion 52, and a piston rod 53 in connection with a pneumatic cylinder 54 has its outer end provided with a yoke 55 which is pivotally connected to the yoke 44 by means of a pivot pin 56 extending through bearing members 57 and the bearing 52. It is thus apparent by referring to Figs. 1 and 2 that movement of the piston rod 53 will actuate the closure.

Figure 1:
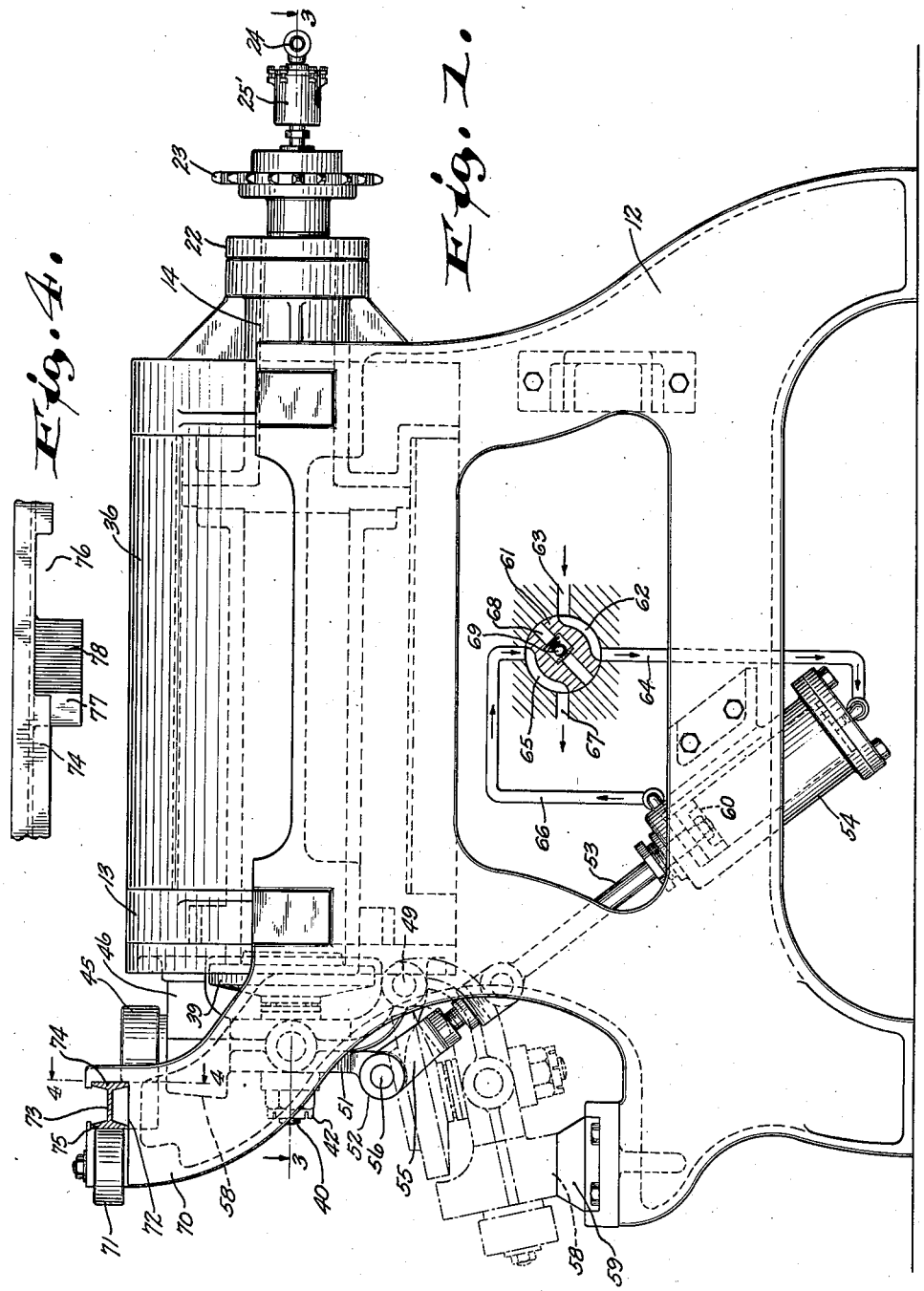
Fig. 1 is a side elevational view of the improved apparatus, the dot-and-dash lines showing the open position of the closure.
Figure 2:
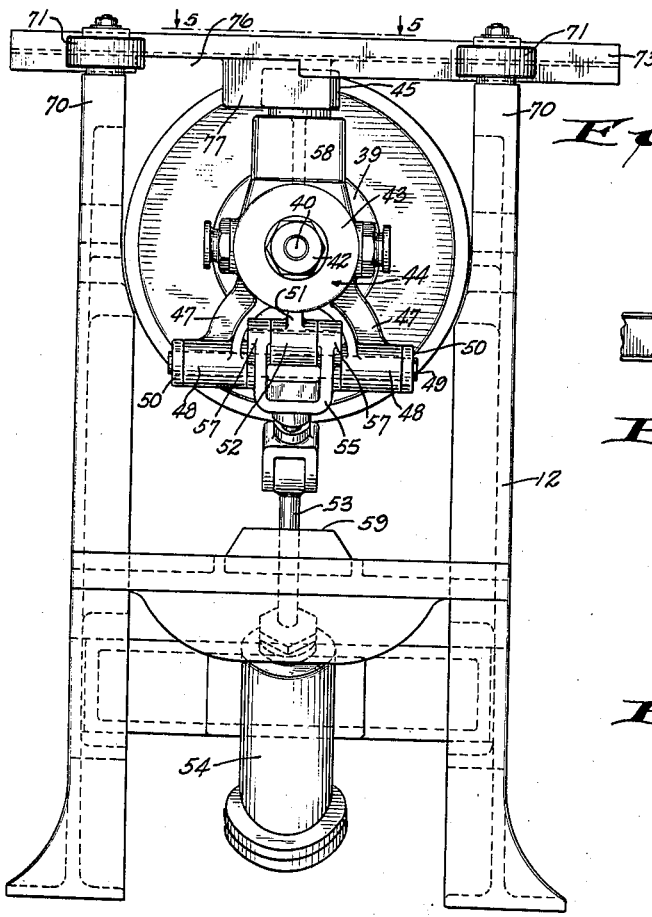
Fig. 2 is a front view of the apparatus.
Figure 5:
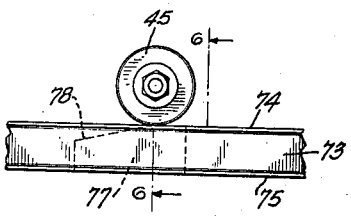
Fig. 5 is a fragmentary detail view taken on line 5—5 of Fig. 2.
Figure 6:
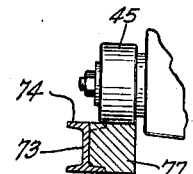
Fig. 6 is a sectional view taken on line 6—6 of Fig. 5.

The upper portion of the yoke 44 is also provided with an outwardly projecting stop portion 58 which is best seen in Fig. 1, and said stop portion is engageable on the opening movement of the closure with a cushion 59 of rubber or other resilient material to cushion the opening movement of the closure.

Within the cylinder 54 the piston rod 53 is connected with a piston 60. To cause movement of the closure from the dot-and-dash line of Fig. 1 to the full line or closing position in said figure, a valve member 61 is turned to the position shown in Fig. 1 to cause a port 62 in the valve to connect a line 63 leading from a source of compressed air with a line 64 leading to the bottom of the cylinder 54. When the valve is in this position, another port 65 therein connects a line 66 leading from the upper portion of the cylinder above the piston with an exhaust port 67. It is thus apparent that when the valve is in the position shown, that compressed air will enter below the piston to force the same upwardly and cause closing of the door to the treating chamber. Air above the piston will be exhausted through the exhaust port 67.

After the door is closed the valve 61 is turned to a position to cause a straight duct 68 therein to connect with ducts 64 and 66. When in this position, communication is broken between the line 66 and the exhaust port 67 and between the inlet 63 and the line 64. Accordingly, when the closure is opened at the end of the treating period the pressure within the treating chamber will throw it open with considerable violence. This will move the piston 60 downwardly, but its movement will not be cushioned due to the fact that the air below the piston has a direct passage way through the ports 64, 68, and 66 to the space above the piston. The bumper 59, however, will cushion the opening movement. In view however of the fact that considerable rebound would normally take place from the bumper, the present arrangement has been designed to check this rebound, and it may readily be seen that any rebound action would cause the piston 60 to move upwardly against the body of compressed air there-above. This air, however, is trapped because of the provision of a non-return check valve 69 in the valve 61 so that the body of air above the piston 60 will effectively check or snub any rebound action.

The front of the frame 12 is formed with forwardly and upwardly curved arms 70 carrying horizontal rollers 71 at the upper ends. Said arms are also provided with guide ways 72 for a slide 73, the slide being movable on the rollers 71 to minimize friction. The slide is preferably of I-beam construction having flanges 74 and 75. By referring to Fig. 4, it will be seen that the flanges 74, 75 are cut out or recessed as at 76 and that a cam block 77 is so secured to the slide that its tapered face 78 cooperates with one end of the recess.

During the closing movement of the door 39, the slide 73 will be in such a position that the roller 45 can pass through the recessed flange portion 76. The slide is then moved manually or otherwise from the right to the left, referring to Fig. 2 to cause the cam surface 78 to engage the roller 45 and guide the same up onto the flange portion 74, as is clear from Figs. 4, 5, and 6. This action tends to wedge the closure into tight sealing relationship with the end opening of the treating chamber.

When it is desired to have the closure opened at the end of a treating interval, the valve 61 is moved to cause the port 68 to register with the ducts 64 and 66. Then the slide 73 is moved to bring the recess 76 into registration with the roller 45. As soon as the roller is entirely clear of the cam face 78 the pressure within the chamber will cause forcible opening of the closure.

The operation of the form of apparatus shown in Figs. 1 to 6 may be summarized as follows: With the closure in the open position shown by dot-and-dash lines in Fig. 1, a suitable amount of grain is inserted into the treating chamber 15. The valve 61 is then turned to the position shown in Fig. 1 to cause upward movement of the piston 60 and piston rod 53 and movement of the closure to sealing position, as heretofore explained in detail. The rail 73 is then moved to the position shown in Figs. 2 and 5 to cause wedging of the closure into tight engagement with the rib 37. The oven may now be caused to rotate through the transmission of motion to the sprocket wheel 23, and the circuit may be completed to the electric heating elements 35 to cause the same to function. Steam may then be admitted to the inlet pipe 24, which steam will pass through the coils 29, as heretofore explained, and be superheated by the electrical heating elements 35. The steam will ultimately be discharged by the nozzle 32 into the treating chamber to raise the pressure therein. The moisture in the steam will permeate the grain within the treating chamber, and said grain will also be subjected to the pressure within the chamber as well as to the influence of the exterior heat from the steam coils 29 and the electrical heating elements 35. After a required time interval has elapsed and after the pressure within the treating chamber has reached a pre-determined maximum, and with the valve 61 turned to a position in which the duct 68 registers with the lines 64 and 66, the rail 73 may be moved quickly to the right, referring to Fig. 2, to bring the recess 76 in front of the roller 45. As soon as the roller is in registration with the recess, the pressure within the chamber will cause forcible opening of the closure and downward movement of the piston rod 53. During such movement of the piston rod, the air below the piston 60 will be transferred through the lines 64, 68, and 66 to a position above the piston. The opening movement of the closure will be cushioned by the rubber bumper 59, and rebound from said rubber cushion will be checked due to the fact that the air above the piston is trapped, due to the check valve 69. This sudden reduction of the pressure within the treating chamber will cause an explosion or puffing up of the starch cells in the grain so that the grain particles are puffed up to many times their original size. Suitable means must be employed to intercept the product upon the opening of the door of the chamber. After the treated product has been entirely removed, the treating chamber may be cleaned out by the application of additional steam, and the process may then be repeated.

In Fig. 7 there is illustrated in partially diagrammatic form an arrangement for rendering the apparatus of Fig. 1 semi-automatic in operation. Referring more particularly to said figure it will be seen that compressed air from a suitable source may be admitted to the pipe line 79 leading to valve 80. The said valve may have a port 81 therein, as shown in Fig. 9, adapted to provide communication between the compressed air line 79 and line 82 leading to the pneumatic cylinder 54, when the port 81 is in the position shown by full lines in Fig. 9. This admits compressed air below the piston 60 to raise the same to the position shown in Fig. 7. When the piston is in the position of Fig. 7 it will be seen that a port 83 is exposed permitting the compressed air below the piston and the compressed air entering from the pipe line 82 to travel into a pipe line 84. Just after the closure reaches sealing position with respect to the treating chamber, a lug 85 carried by the piston rod 53 will trip a latch member 86 connected through links 87 and 88 with a valve handle 89 in connection with a valve 90 to open said valve. When said valve is opened, a duct 91 therein is in the full line position shown in Fig. 11 so that the compressed air entering the pipe line 84 from the port 83 can pass through pipe line 92 into the bottom of another pneumatic cylinder 93 to cause movement of a piston 94 therein to the position shown in Fig. 7. The piston is connected through a piston rod 95 with the slide rail 73 and actuates the same to wedge the closure in locking position in the manner described in connection with the form of the invention shown in Fig. 1. Although Fig. 7 shows the parts in diagrammatic form, it is to be understood that the cylinder 93 and rail 73 are disposed in a horizontal plane so that the cylinder can properly actuate the rail.

When the piston 60 is being moved upwardly during the closing of the door to the treating chamber, air above the piston is exhausted through a pipe line 96 to a valve 97. The valve 97 has its operating handle 98 connected by a link 99 with the operating handle of the valve 80 so that they may be operated simultaneously. By referring to Fig. 7 it will be seen that when the valve 80 is in on position to admit air from the pipe line 79 to the cylinder 54, that the valve 97 is in such a position that its valve duct 100 communicates with an exhaust port 101 as shown in full lines in Fig. 10. Thus the air exhausted from above the piston 60 can escape from the exhaust port 101. It will also be seen that the valve duct 100 when in the full line position of Fig. 10, also connects a pipe line 102 leading from above the piston 94 in the cylinder 93 with the exhaust port 101. Thus when the piston 94 is actuated to operate the rail, air above the piston 94 in the cylinder 93 may be exhausted through the same port 101.

After the closure has been locked in position by the automatic movement of the rail 73, the link 99 is shifted to move the port 81 in the valve 80 to the dotted line position shown in Fig. 9. This cuts off communication between the source of compressed air and the pipe line 82, and at the same time connects the pipe line 82 with the exhaust port 103. Shifting of the link 99 will also reverse the position of the valve 97 to bring the port 100 therein to the dotted line position shown in Fig. 10 so that said port no longer communicates with the exhaust opening 101.

When, during the treating of the grain within the chamber, the steam pressure reaches a pre-determined maximum as shown by a pressure gage 104, the pressure operates upon a diaphragm 105 of standard construction to automatically operate a valve 106 to admit compressed air from the source line 79 into a pipe line 107. Due to the fact that the duct 100 in the valve 97 is in the dotted line position of Fig. 10, the compressed air from the line 107 can enter the cylinder 93 above the piston 94 and also enter the line 96. Due to the fact, however, that the piston 60 in the cylinder 54 is locked in fixed position, the force of the air pressure will effect the piston 94 in the cylinder 93 to slide the rail 73 to a position to permit opening of the closure for the treating chamber. As soon as the closure opens, the lug 85 will move out of engagement with the trip 86, and the spring 108 will move the valve 90 to such a position that the duct 91 in said valve will assume the dotted line position shown in Fig. 11 to cut off communication between the pipe lines 92 and 84. This will permit air from beneath the piston 94 which was formerly exhausted through the lines 84, port 83, line 82 and exhaust 103 in valve 80, to be exhausted through an exhaust port 109 in connection with the valve 90. As the piston 60 is moved down due to the opening of the door for the treating chamber, the air pressure from the line 107 will build up in the space in the cylinder 54 above the piston 60. The door during its opening movement will, as in the form of the invention shown in Fig. 1, be cushioned by the rubber bumper 59. Any rebound of the door will, however, be checked by the air pressure above the piston, which air is confined due to the position of the valve 97 and to the fact that it cannot back up past a non-return check valve 110 in the line 107.

As soon as these actions have taken place, the steam pressure within the system will be reduced to such a point that the diaphragm 105 will no longer hold the valve 106 open. This valve will therefore automatically close to cut off further admission of compressed air from the source line 79 to the line 107.

It will thus be seen that by a simple movement of the valve control link 99, that the door will be closed pneumatically; that as soon as it reaches closed position, the rail 73 will be automatically actuated to lock the door in closed position; and that as soon as the pressure within the treating chamber reaches a pre-determined maximum, that the valve 106 will be automatically opened to move the rail 73 to door releasing position and permit reduction of the pressure within the treating chamber and removal of the treated product.

It may not be desirable in certain uses to have the opening of the door automatic. In such case the gage 104 may be placed directly on the steam inlet to the treating chamber, as shown in Fig. 8, and the pipe line leading to the pressure diaphragm 105 eliminated. A hand valve 106' may be then substituted for the automatic valve 106 as shown in Fig. 8. With this arrangement the closing of the treating chamber door will be accomplished in the same manner as shown in Fig. 7, but in order to cause opening, it is necessary to manually turn the valve 106' to cause movement of the piston 94 in the cylinder 93 and actuation of the slide to release the door. As soon as the door has been fully opened, the valve 106' can be turned back to off position. By using the hand valve as shown in Fig. 8, better control over the various products may be obtained, as it may be desirable to have the opening of the treating chamber door take place at different pressures and at the expiration of different time intervals for various products.

From the above it will be seen that in all forms of the invention, very efficient door operating mechanism has been provided, and that in all forms the closing of the door is accomplished pneumatically. It will also be seen that the opening movement of the door is originally cushioned by a rubber bumper, and any rebound from the bumper is checked pneumatically. In addition, it will be seen that in Fig. 7 an arrangement is provided which is semi-automatic and that means is provided for automatically actuating the slide to lock the door in closing position, and for automatically moving the slide at the end of a treating interval to permit opening of the door. It will further be seen that in Fig. 8 an additional arrangement is shown which is the same arrangement as in Fig. 7 except that the opening of the door is under manual control.

While the principal embodiments of the invention have been shown and described herein, it is obvious that various other changes and modifications may be made without departing from the spirit of the invention, and all of such changes are contemplated as may come within the scope of the claims.

What we claim is:

1. In an apparatus for treating grain, a treating chamber, a closure for said chamber, a hinge connection on one side of said closure, and a slide movable endwise across the other side of said closure to lock the latter in chamber sealing position.

2. In an apparatus for treating grain, a treating chamber, a closure for said chamber, a hinge connection on one side of said closure, a slide movable endwise across the other side of said closure to lock the latter in chamber sealing position, and a cam member in connection with said slide cooperable with said closure to exert a wedging action thereon.

3. In an apparatus for treating grain, a treating chamber, a hinged closure for said chamber, and a slide movable transversely of the closure when the same is shut to lock the closure in chamber sealing position, said slide having a recessed portion through which the free end of the closure may pass when the slide is in a predetermined position.

4. In an apparatus for treating grain, a treating chamber, a hinged closure for said chamber, and a slide movable transversely of the closure when the same is shut to lock the closure in chamber sealing position, said slide having a recessed portion through which the free end of the closure may pass when the slide is in a predetermined position, and a cam member having an inclined surface cooperable with the recess in said slide to exert a wedging action on the free end of the closure when the slide is moved.

5. In an apparatus for treating grain, a frame, a treating cylinder rotatable on its axis in said frame and having an open end, a closure for said open end of the cylinder, and means fixed against rotation with the cylinder for holding the closure in sealing position while permitting it to rotate with the cylinder.

6. In an apparatus for treating grain, a frame, a treating cylinder rotatable on its axis in said frame and having an open end, a closure for said open end of the cylinder, a yoke hinged at one end to said frame and fixed thereby against rotation with the cylinder, the closure being rotatably connected to said yoke and movable thereby, and means engageable with the side of the yoke opposite to the hinge for locking the closure in cylinder sealing position.

7. In an apparatus for treating grain, a treating chamber, a closure for said chamber, pneumatic means for moving said closure from open to closed position, other means including a slide movable endwise across the closure for locking said closure in closed position, and additional pneumatic means for operating said slide.

8. In an apparatus for treating grain, a treating chamber, a closure for said chamber, means for moving said closure from open to closed position, and other means including an endwise movable slide automatically operable when the closure reaches closed position for locking it in said position.

9. In an apparatus for treating grain, a treating chamber, a closure for said chamber, means for moving said closure from open to closed position, means including a slide movable endwise across the closure for locking the closure in closed position, means for admitting a treating fluid under pressure to said chamber, and means operable when said pressure reaches a pre-determined maximum for automatically releasing said slide to permit opening of the closure 10. In an apparatus for treating grain, a treating chamber, a closure for said chamber, means for moving said closure from open to closed position, means including an endwise movable slide automatically operable when the closure reaches closed position for locking it in said position, means for admitting a treating fluid under pressure to said chamber, and means operable when said pressure reaches a pre-determined maximum for automatically releasing said slide to permit opening of the closure.

11. In an apparatus for treating grain, a treating chamber, a closure for said chamber, pneumatic means for moving said closure from open to closed position, pneumatic means automatically operable when the closure reaches closed position for locking it in said position, means for admitting a treating fluid under pressure to said chamber, and pneumatic means operable when said pressure reaches a pre-determined maximum for automatically releasing said locking means to permit opening of the closure.

12. In an apparatus for treating grain, a treating chamber, a closure for said chamber, means for locking said closure in closed position, means for creating a pressure in said chamber, said locking means being releasable to permit the pressure within the chamber to open said closure, means for cushioning the opening movement of said closure, and pneumatic means for checking rebound from said cushioning means.

13. In an apparatus for treating grain, a treating chamber, a movable closure for said chamber, a cylinder having a piston therein, operating connections between said piston and closure, means for admitting compressed air below said piston to move said closure from open to closed position, means for cushioning the opening movement of said closure, and means for creating air pressure above the piston in said cylinder during opening movement of the closure to check rebound of the closure from the cushioning means.

JOHN HEUE.
ARTHUR W. WERNER.